United States Patent [19]

Yoshimura et al.

[11] Patent Number: 4,638,366
[45] Date of Patent: Jan. 20, 1987

[54] AUTOMATIC IRIS ADJUSTMENT SYSTEM

[75] Inventors: Yasuo Yoshimura, Hachioji; Kunio Yamauchi; Kenji Saito, both of Kodaira, all of Japan

[73] Assignee: Hitachi Denshi Kabushiki Kaisha, Tokyo, Japan

[21] Appl. No.: 779,793

[22] Filed: Sep. 24, 1985

[30] Foreign Application Priority Data

Sep. 28, 1984 [JP] Japan ............... 59-145860[U]

[51] Int. Cl.$^4$ ........................................... H04N 5/238
[52] U.S. Cl. ................................................. 358/228
[58] Field of Search ............... 358/228; 354/446, 451, 354/452; 352/141

[56] References Cited

U.S. PATENT DOCUMENTS

| | | | |
|---|---|---|---|
| 3,120,161 | 2/1964 | Pickens et al. | 354/451 |
| 3,430,053 | 2/1969 | Westhaver | 354/451 X |
| 4,471,383 | 9/1984 | Shiono et al. | 358/228 |
| 4,473,843 | 9/1984 | Bishop et al. | 358/228 |
| 4,562,476 | 12/1985 | Shikano et al. | 358/228 |

Primary Examiner—William B. Perkey
Attorney, Agent, or Firm—Antonelli, Terry & Wands

[57] ABSTRACT

An automatic iris adjustment system comprises a camera lens including an iris driving means for controlling the iris value; an image pickup element for converting the amount of light incident to the camera lens into an electrical signal; means for comparing the iris adjustment signal voltage $V_I$ from the image pickup element with the reference voltage $V_O$ to evaluate an error voltage $V_E$ (i.e., $V_E = V_I - V_O$); means for calculating a varying component $\Delta$IRIS of iris control value as a predetermined function of the error voltage $V_E$; means for calculating an iris control value $IRIS_n$ basing on the calculated varying component $\Delta$IRIS of iris control value; and means for controlling the iris driving means in response to the calculated iris control value $IRIS_n$.

4 Claims, 7 Drawing Figures

AUTOMATIC IRIS ADJUSTMENT SYSTEM

BACKGROUND OF THE INVENTION

This invention relates to an automatic iris adjustment system used for television cameras, video cameras, and the like.

Generally, the auto-iris circuit used in the television camera consists of a camera lens including an iris servo motor, an image pickup element placed inside the camera main unit, an image signal amplifier, a rectifying circuit, a voltage amplifier, and an iris servo amplifier. The circuit operates to control the iris value on a closed-loop basis so that the amount of light incident to the image pickup element is constant.

FIG. 1 shows in block diagram the conventional auto-iris control system. The light from a subject is incident to the camera lens 1, which has the iris value controlled by the servo motor 7. The light coming out of the lens 1 is incident to the image pickup element 2, and it is converted into a small-level electric signal. The signal is delivered to the image signal amplifier 3 and amplified to the prescribed level. The output of the image signal amplifier 3 is rectified by the rectifying circuit 4 so that it is converted into a d.c. voltage level. The produced d.c. voltage signal is compared with the reference voltage by the voltage amplifier 5, which then produces an amplified differential voltage. The output voltage signal is fed to the iris servo amplifier 6 so that it is subjected to power amplification. The servo motor 7 is driven by the output signal corresponding to the amplified differential voltage provided by the iris servo amplifier 6, and the iris value of the camera lens 1 is controlled such that the output d.c. voltage level of the rectifying circuit 4 is equal to the reference voltage.

This system forms a closed loop circuit, and the iris value is controlled so that the amount of light incident to the image pickup element 2 is constant. In the auto-iris circuit of this type, the response of iris value to the variation of incident light is adjusted by changing the amplification factor and frequency response of the voltage amplifier. The voltage amplifier is generally designed to have a large amplification factor so as to ensure the high response operation.

However, if the voltage amplification factor is too large, a swing-back phenomenon called "hunting" occurs when the amount of incident light has varied abruptly.

On this account, the voltage amplification factor and frequency response of the voltage amplifier are determined on a compromise basis in view of the response and hunting. In general, the occurrence of hunting is prevented by slightly sacrificing the response, which results in a noticeable delay of response appearing on the display.

SUMMARY OF THE INVENTION

An object of this invention is to provide an automatic iris adjustment system which is highly responsive to the variation in the amount of incident light from the subject and is free from a hunting operation.

Another object of this invention is to provide an automatic iris adjustment system which does not fall into a hunting operation even if the amount of incident light has varied abruptly.

DESCRIPTION OF THE PREFERRED EMBODIMENTS

Figure 1:
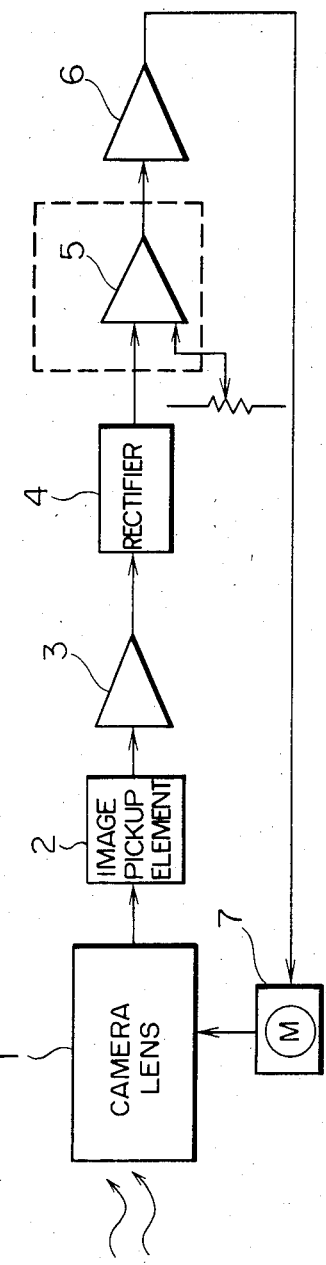
FIG. 1 is a block schematic diagram showing the conventional automatic iris adjustment system.
Figure 2:
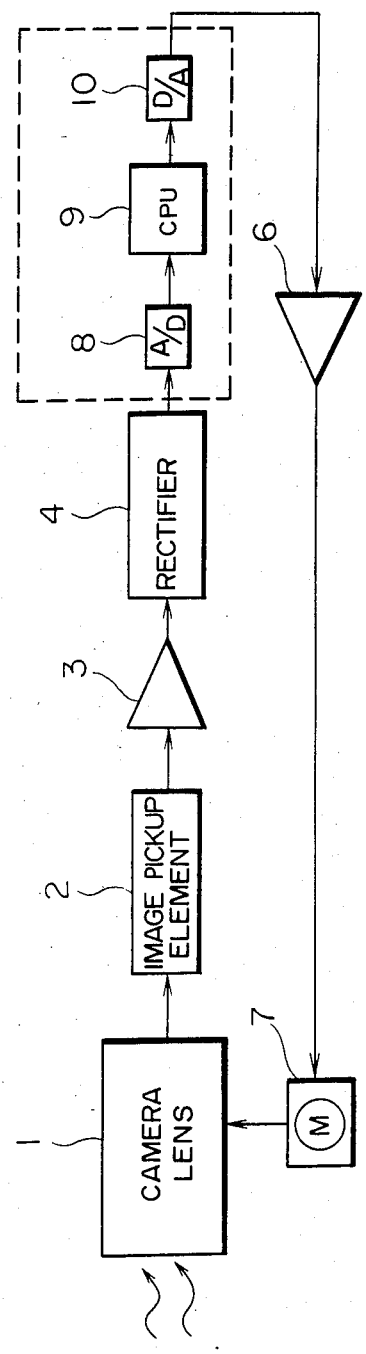
FIG. 2 is a block schematic diagram showing the automatic iris adjustment system embodying the present invention.

A preferred embodiment of this invention will be described in detail. FIG. 2 is a block schematic diagram showing an embodiment of this invention, in which the arrangement up to the rectifying circuit 4 is identical to the conventional system, while the voltage amplifier 5 is replaced with the combination of an analog-to-digital converter (ADC) 8, a microprocessor (CPU) 9, and a digital-to-analog converter (DAC) 10. The operation of the arrangement is as follows.

Figure 3:
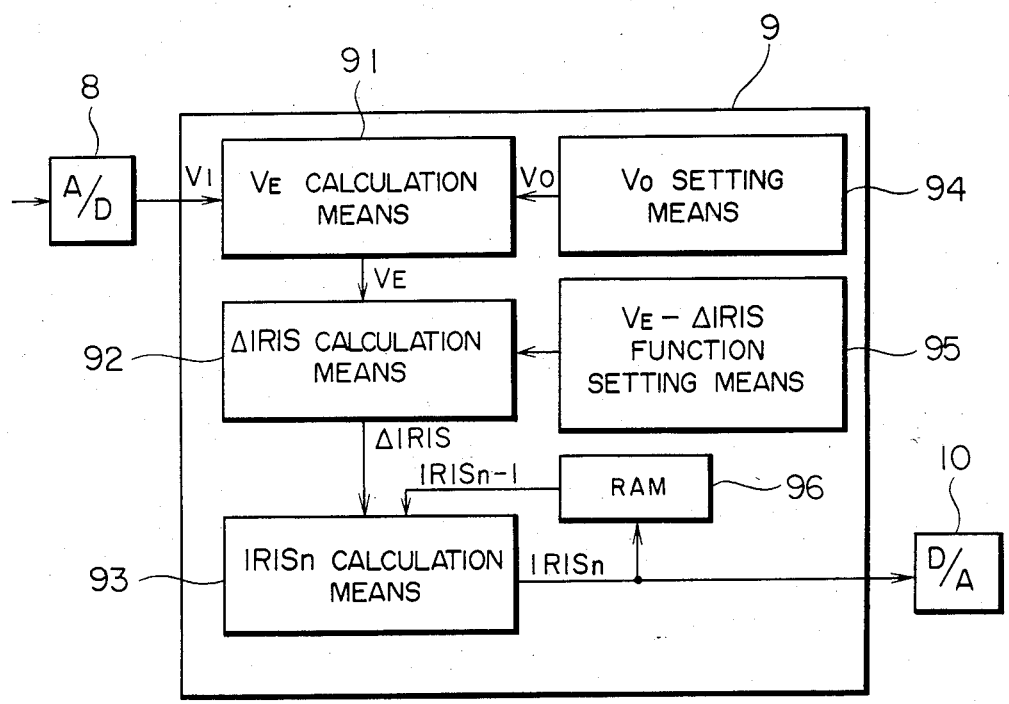
FIG. 3 is a block schematic diagram showing in detail the principal portion of the arrangement shown in FIG. 2.
Figure 4:
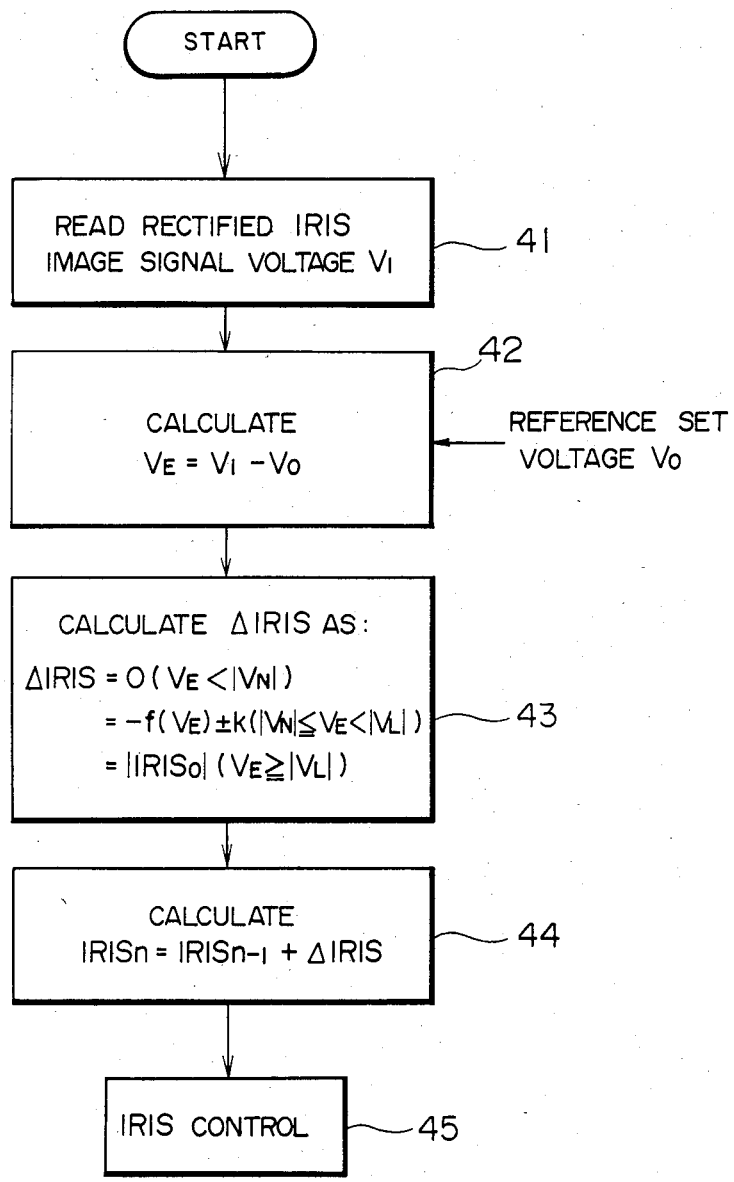
FIG. 4 is a flowchart explaining the operation of the embodiment shown in FIG. 2.

The signal rectified by the rectifying circuit 4 is fed to the ADC 8 and converted into a digital signal. The digital signal is entered to the CPU 9 and processed as shown by the functional block diagram of FIG. 3 and the flowchart of FIG. 4.

Namely, the output $V_I$ of the ADC 8 is compared with the reference iris setting voltage $V_O$ which has been set in the CPU 9, so that the error voltage $V_E$ is calculated ($V_E = V_I - V_O$). Subsequently, the varying component $\Delta$IRIS of iris control value is calculated from the error voltage $V_E$ using the functional relation (will be described shortly) which is also preset in the CPU 9. The varying component $\Delta$IRIS is added to the previous iris control value $IRIS_{n-1}$ to produce a new iris control value $IRIS_n$. Namely, calculation $IRIS_n = IRIS_{n-1} + \Delta$IRIS is conducted iteratively so that a new iris control value $IRIS_n$ is always provided. Although in this embodiment this calculation takes place at a 10 ms interval, the period may be set arbitrarily. The iris control value $IRIS_n$ produced by the CPU 9 is converted into an analog signal by the DAC 10 and fed to the iris servo amplifier 6 to complete a closed-loop circuit as in the conventional system.

Figure 5:
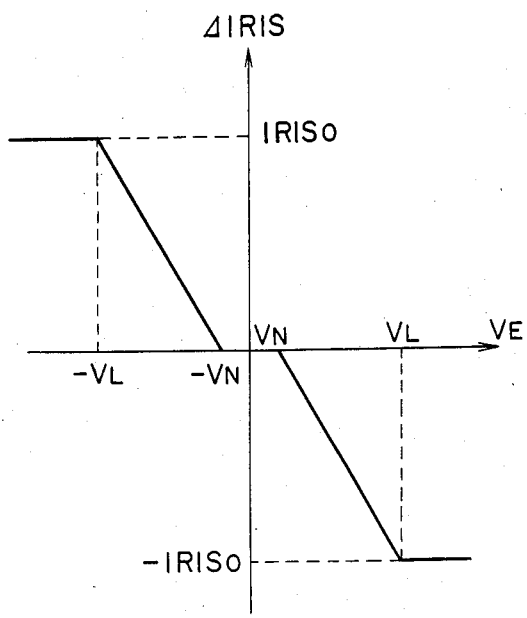
FIG. 5 is a graph showing the characteristics of the iris value with respect to the error signal.

The function set in the CPU 9 as a basis of calculating the varying component $\Delta$IRIS of iris control value is provided with a dead zone ($\pm V_N$ of the error voltage $V_E$) as shown in FIG. 5, so that the iris control value which operates the servo motor 7 of the lens 1 is insensitive to a small variation in the output of the rectifying circuit 4, such as a ripple voltage.

Since the function is set so that the varying component $\Delta$IRIS of the iris control value increases in proportion to the error voltage $V_E$, an abrupt change in the incident light produces a large error voltage, resulting in a quick response of the lens, while the error voltage decreases as it approaches the setting voltage, resulting in a slower lens speed and, thus, in the prevention of hunting.

In addition, a speed limit zone is provided so that the response speed does not exceed a predetermined value for the case where the absolute value of the error voltage $V_E$ is in excess of a preset value $V_L$, and this characteristic is also effective for the prevention of hunting. In FIG. 5, $IRIS_O$ represents the upper limit of the varying component of iris control value.

By setting the function as described above, the automatic iris adjustment system with high response, but without hunting is accomplished.

Figure 6:
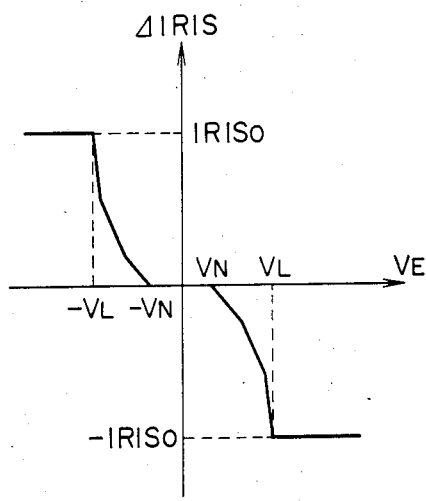
FIGS. 6 and 7 are graphs each showing modified characteristics of the iris value with respect to the error signal.
Figure 7:
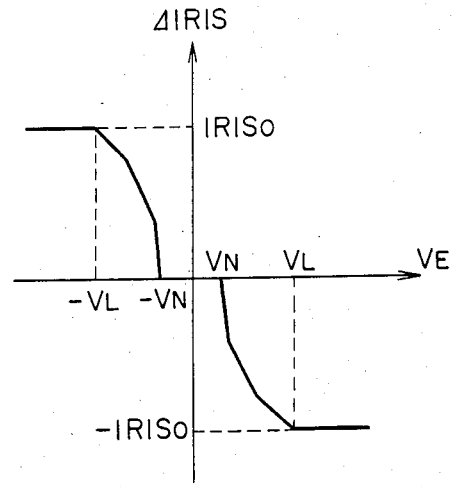

Although the function for defining the relation between $V_E$ and $\Delta IRIS$ used in the above embodiment is linear between the dead zone and speed limit zone, it does not need to be linear. Instead, it may be a serial connnection of line segments as shown in FIGS. 6 and 7, and the freedom in choosing a function is the feature of this system.

The automatic iris adjustment system according to this invention have the variable response characteristics so that it responds quickly for a large difference in the amount of incident light from the prescribed light level, and responds modelately when the difference is small. Moreover, provision of the upper limit for the response speed prevents the occurrence of hunting during the operation even if the amount of incident light has varied abruptly.

We claim:

1. An automatic iris adjustment system comprising:
   a camera lens including an iris driving means for controlling the iris value;
   an image pickup element for converting the amount of light incident to said camera lens into an electrical signal;
   calculation means which compares the iris adjustment signal voltage $V_I$ provided by said image pickup element with a reference voltage $V_O$ to evaluate an error voltage $V_E$ (i.e., $V_E = V_I - V_O$);
   calculation means which evaluates a varying component $\Delta IRIS$ of iris control value as a predetermined function of the error voltage $V_E$;
   calculation means which evaluates an iris control value $IRIS_n$ basing on the calculated varying component $\Delta IRIS$ of iris control value; and
   means for controlling said iris driving means in response to the calculated iris control value $IRIS_n$.

2. A system according to claim 1, wherein said function is such that the varying component $\Delta IRIS$ of iris control value is zero when the absolute value of the error voltage $V_E$ is smaller than a predetermined value $V_N$, the varying component $\Delta IRIS$ of iris control value is proportional to the absolute value of the error voltage $V_E$ when the absolute value of the error voltage $V_E$ is larger than or equal to the predetermined value $V_N$ and smaller than a predetermined value $V_L$, and the varying component $\Delta IRIS$ of iris control value is constant at $IRIS_O$ when the absolute value of the error voltage $V_E$ is larger than or equal to the predetermined value $V_L$.

3. A system according to claim 1, wherein said calculation means for evaluating the iris control value $IRIS_n$ comprises means for adding the varying component $\Delta IRIS$ of iris control value to a previous iris control value $IRIS_{n-1}$.

4. An automatic iris adjustment system comprising:
   a camera lens including an iris driving means for controlling the iris value;
   an image pickup element for converting the amount of light incident to said camera lens into an electrical signal;
   amplifying means for amplifying a small signal produced by said image pickup element;
   rectifying means for rectifying the amplified signal;
   calculation means which compares the iris adjustment signal voltage $V_I$ provided by said rectifying means with a reference voltage $V_O$ to evaluate an error voltage $V_E$ (i.e., $V_E = V_I - V_O$);
   calculation means which evaluates a varying component $\Delta IRIS$ of iris control value in such a way that the varying component $\Delta IRIS$ of iris control value is zero when the absolute value of the error voltage $V_E$ is less than a predetermined value $V_N$, the varying component $\Delta IRIS$ of iris control value is proportional to the absolute value of the error voltage $V_E$ when the absolute value of the error voltage is larger than or equal to the predetermined value $V_N$ and less than a predetermined value $V_L$, and the varying component $\Delta IRIS$ of iris control value is constant at $IRIS_O$ when the absolute value of the error voltage $V_E$ is larger than or equal to the predetermined value $V_L$;
   calculation means which evaluates an iris control value $IRIS_n$ basing on the calculated varying component $\Delta IRIS$ of iris control value; and
   means for controlling said iris driving means in response to the calculated iris control value $IRIS_n$.

* * * * *